Figure 1:
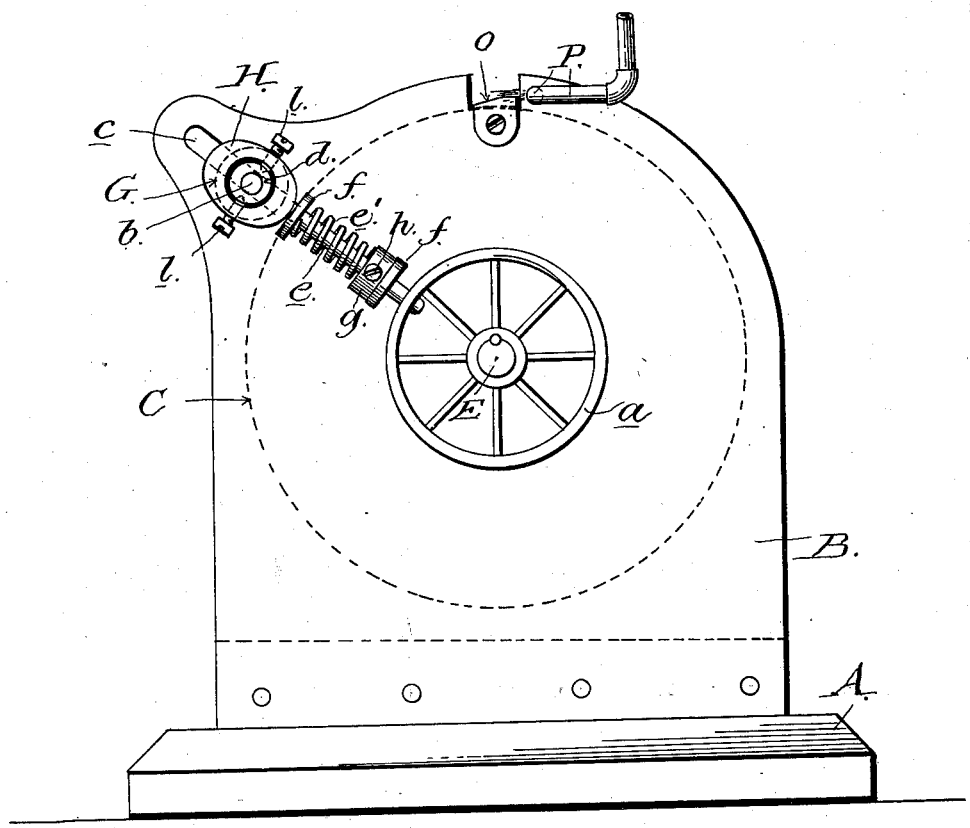

No. 657,322. Patented Sept. 4, 1900.
T. W. TALIAFERRO.
FAT SKINNING MACHINE.
(Application filed Apr. 2, 1900.)

(No Model.) 2 Sheets—Sheet 1.

WITNESSES
Chapman W. Fowler
Geo. M. Copenhaver.

INVENTOR
Thomas W. Taliaferro
by T. Walter Fowler
his Attorney

THE NORRIS PETERS CO., PHOTO-LITHO., WASHINGTON, D. C.

No. 657,322. Patented Sept. 4, 1900.
T. W. TALIAFERRO.
FAT SKINNING MACHINE.
(Application filed Apr. 2, 1900.)
(No Model.) 2 Sheets—Sheet 2.
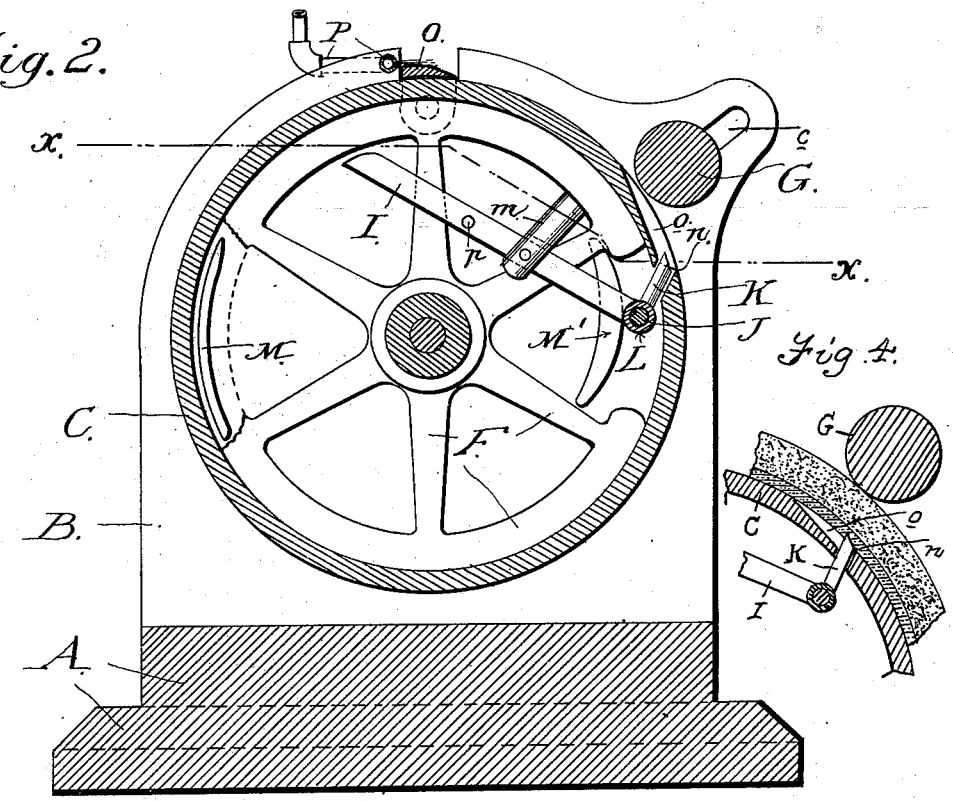
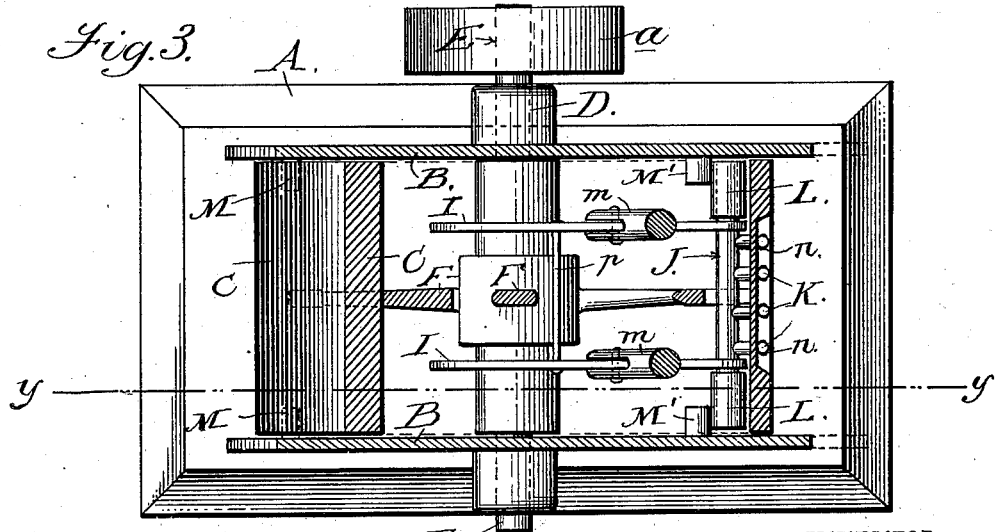

UNITED STATES PATENT OFFICE.

THOMAS W. TALIAFERRO, OF SOUTH OMAHA, NEBRASKA.

FAT-SKINNING MACHINE.

SPECIFICATION forming part of Letters Patent No. 657,322, dated September 4, 1900.

Application filed April 2, 1900. Serial No. 11,173. (No model.)

*To all whom it may concern:*

Be it known that I, THOMAS W. TALIAFERRO, a citizen of the United States, residing at South Omaha, in the county of Douglas and State of Nebraska, have invented new and useful Improvements in Fat-Skinning Machines, of which the following is a specification.

My invention relates to certain new and useful improvements in machines intended for use in packing-houses for skinning "back fat" or other fats from which the skin is to be cut and for other kindred purposes; and my invention comprehends the employment of a rotatable drum and a yielding pressure-roller between which and the periphery of the drum the pieces of fat or carcass are fed and in the employment of alternately appearing and disappearing pins or devices which automatically engage the skin of the meat from below and carry the meat to a suitable knife, fixed or adjustable, by means of which the skin is severed or separated from the fat.

The invention further includes a perforated pipe exterior and proximate to the knife and adapted to discharge jets of steam or water, preferably hot, upon the knife for the purpose of heating the same sufficiently to cause the fat to slightly melt as the knife separates the skin from the fat and moistening the knife to facilitate the operation and maintaining the knife in a clean condition.

The invention also includes a means for positively operating the pins or teeth which engage the skin from below, whereby the said pins are projected or caused to appear beyond the outer surface of the drum to engage the skin during the period the piece of meat is being carried to and operated upon by the knife, and said pins are subsequently operated and caused to be retracted or disappear below the outer surface of the drum or cylinder to release their contact with the skin and permit the latter to be removed or discharged from the machine.

The invention also consists of the parts and the constructions and combinations of parts which I shall hereinafter describe and claim.

In the accompanying drawings, in which similar letters of reference indicate corresponding parts, Figure 1 represents a side elevation of a fat-skinning machine embodying my invention. Fig. 2 is a vertical sectional view of the same on the line $y\ y$ of Fig. 3. Fig. 3 is a horizontal sectional view on the line $x\ x$ of Fig. 2. Fig. 4 is a sectional detail of a portion of the drum and the roller and showing the pins engaging the piece of fat.

In carrying out my invention I construct a firm base or bed A, of any suitable or desired form, material, or construction, which base and the vertical sides B constitute the essentials of an exterior stationary frame or casing, within which is rotatably mounted a drum or cylinder C, which I will presently describe. The vertical sides B are formed or provided with journal boxes or bearings D for the journal ends of a horizontal transverse shaft E, to which power is applied, as by means of a driving-pulley $a$. The shaft is also supplied with or has secured to it means for operatively supporting the drum or cylinder, so that it will rotate between the inner sides of the main frame or casing. As herein shown, these means consist of a spider F, the hub of which is fixed to the shaft, while the arms extend to and are fixed to the inner periphery of the drum, against the outer periphery of which latter the skin side of the meat is held during the operation of trimming the fat from the skin. In conjunction with this drum or cylinder I employ a pressure-roller G, lying between the inner surfaces of the sides B and having its shaft-journals $b$ extending through slots $c$, formed in said sides radial to the axis of the drum. These journals are rotatively mounted in short sleeves $d$, which in turn are fixed in boxes or bearings H, having stems or shanks $e$ slidably mounted in guides $f$, secured to the outside of the sides B. Around the shanks or stems $e$ are placed coiled springs $e'$, the tension of which is regulated to any desired extent by means of collars $g$ and set-screws $h$. From this description it will be apparent that the pressure-roller G is yieldingly mounted and normally presses against the outer periphery of the revoluble drum or cylinder C, and said roller is capable of accurate adjustment against the drum by reason of the openings in the bearings H being of greater diameter than the sleeves $d$, which rotatably receive the ends of the roller-shaft, and by reason of set-screws $l$ passing into the bearings from opposite sides and engaging the said sleeves for centering them, and thereby centering or adjusting the roller with relation to the opposing face of the drum.

Fixed to the inner periphery of the drum or cylinder are lugs or posts $m$ or equivalent means for pivotally securing the lever-arms I of a rocking frame. This frame consists of a lever-arm I, disposed near the inner face of each of the sides B and connected together at one end by means of a bar or rod J, having fixed to it or otherwise carrying a series of pins or teeth K, which project substantially at right angles to the bar or rod and lie in line with a corresponding series of holes $d$ made through the drum or cylinder. The outer surface of the drum in advance of these holes is shown as depressed at $o$, and the holes are made in a shoulder at the base of this depression, and the outer ends of the pins or teeth are beveled or otherwise made with sharp points adapted to better engage the back or skin side of the piece of meat and carry it during the skinning operation.

The ends of the transverse bar or rod J extend beyond the lever-arms I and proximate to the inner surfaces of the sides B and are preferably provided with sleeves or rollers L, which are to be engaged by suitable cams or curved-face lugs M M', fixed to the inner faces of said sides B and adapted to actuate the rocking frame and its pins or teeth. There are two sets of lugs or cams on each side plate B, one lug being on each side of the center of the side, and one of said lugs M is designed to effect the disappearance of the points of the pins or teeth K within or below the outer periphery of the drum or cylinder, as when the piece of skin is to be released after the fat has been removed from it, while the other and opposite lug M' on the same side operates to cause the appearance or projection of the pins or teeth, so that they will engage the skin side of the meat and carry the piece of meat to the skinning-knife. The long arms of the levers I may be connected by a transverse rod or bolt $p$ to prevent them spreading, and their outer ends lie sufficiently close to the inner periphery of the drum when the pins are projected through the latter that when the said pins are retracted or caused to disappear by the operation of the cams M the said outer ends of the lever-arms contact with the inner periphery of the drum, and thereby limit the inward movement of the pins or teeth.

Secured to the sides B in either a fixed or adjustable position is a knife or cutter O, the beveled edge of which is presented toward the pressure-roller. Back of this knife and extending transversely across the machine is a perforated pipe P, adapted to discharge jets of hot water or steam upon the outside of the knife for the purpose of keeping the knife moist and warm, thereby facilitating the separation of the skin from the fat and insuring a cleanly condition of the knife and causing the fat to slightly melt as the knife separates the skin therefrom.

The operation of the machine is essentially as follows: The piece of meat is placed beneath the pressure-roller G with the skin side upon the drum or cylinder. As the cylinder rotates the cams M' operate the rocking frame and cause the pins or teeth K to appear through their openings and to engage the skin side of the piece of meat from below, no part of the fat side being thus engaged, and this operation of the pins or teeth occurring about the time the pins pass beneath the pressure-roller, whereby the pins are forced into the skin and hold the same during the succeeding operation of carrying the meat to the skinning-knife, where the fat is cleaved from the skin. After the removal of the fat the skin is carried forward until the other cams M engage the sleeves or extended ends of the rocking frame when said frame is rocked about its pivotal connections, and the pins K are retracted or caused to disappear within or beneath the outer periphery of the drum and the skin thereby released, this operation occurring during each rotation of the drum.

The teeth or pins are self-contained in the drum and come up from below and engage the skin side only of the piece of meat, thereby enabling the knife to remove all the fat, which is not done in machines of this type where the gripping devices operate on the piece of meat from above.

The machine works automatically, is simple in its parts, and strongly constructed. The skinning operation is quickly and neatly done, much more so than when done by hand, and all fat is removed, thereby saving in the amount of fat obtained.

Having thus described my invention, what I claim as new, and desire to secure by Letters Patent, is—

1. In a fat-skinning machine, the combination with a revoluble drum, a pressure device and a knife or cutter, of devices contained within the drum and adapted to engage the skin side of the piece of meat and means for alternately projecting said devices beyond the perimeter of the drum and retracting them within it.

2. In a fat-skinning machine employing a revoluble drum or cylinder a pressure device and a knife or cutter, devices carried within the drum and engaging the skin from below, and means for alternately projecting and retracting the devices to cause them to be alternately projected and retracted, with relation to the periphery of the drum or cylinder.

3. In a fat-skinning machine and in combination with a revoluble drum or cylinder, a pressure-roller and a knife or cutter, means carried within the drum and operating upwardly for engaging the piece of meat from below, and means for retracting the engaging means and causing them to release the piece of meat and be retracted within the periphery of the drum.

4. A fat-skinning machine including a revoluble drum or cylinder, a pressure device, a knife or cutter and means carried within the perimeter of the drum and operating outwardly to engage the skin side of the meat.

5. A fat-skinning machine including a revoluble drum or cylinder, a pressure device, a knife or cutter, pointed pins or teeth carried by the drum, and means for projecting and retracting said pins or teeth with relation to the outer periphery of the drum whereby the piece of skin is engaged and released.

6. In a fat-skinning machine, the combination with a revoluble drum or cylinder and a pressure-roller between which and the drum the piece of meat passes, and a skinning-knife, of normally-retracted devices within the drum and means for projecting them upwardly into contact with the skin side of the piece of meat as they pass beneath the roller.

7. In a fat-skinning machine, the combination with a revoluble drum and a pressure device between which and the drum the piece of meat passes, and a skinning-knife, of pins or teeth carried by the drum and operating in opposition to the roller, and engaging the piece of meat from below, and means for retracting the pins or teeth below the surface of the drum and releasing the piece of skin.

8. In a fat-skinning machine, the combination of a revoluble drum or roller, a pressure-roller, alternately projecting and retracting pins or teeth carried by the drum, means for causing the pins or teeth to be projected and engage the skin of the meat as the former pass the roller, a knife, against which the piece of meat is carried while held by the pins or teeth, and means for causing the pins or teeth to release the piece of skin and be retracted within the periphery of the drum.

9. In a fat-skinning machine, the combination with a revoluble drum, a pressure device, and a knife or cutter fixed with relation thereto, of a rocking frame within the drum and carried thereby, and having pins or teeth normally retracted within the perimeter of the drum and lying in line with corresponding holes in the drum, and means fixed in the path of the rocking frame and actuating the latter to project the pins or teeth upwardly beyond the perimeter of the drum to enable said pins or teeth to engage the skin side of the meat.

10. In a fat-skinning machine, the combination with a revoluble drum, a pressure device, and stationary knife or cutter, of a rocking frame within the drum and carried thereby, pointed pins or teeth carried by the frame in line with holes in the rim of the drum, means for projecting the pins or teeth upwardly into engagement with the under or skin side of the meat, and other means for retracting the pins or teeth and thereby releasing their contact with the skin.

11. In a fat-skinning machine, the combination of a pressure-roller, a revoluble drum or cylinder having a transverse series of holes in its rim, lever-arms pivotally secured within the drum and a transverse bar or rod connecting said arms, pins or teeth on said bar or rod and each in line with and operating through one of said holes, stationary lugs or cams on the inner sides of the main frame or casing and in the path of a member of the rocking frame, adapted to operate the frame and thereby project the pins or lugs in one movement, to engage the skin, and retract them, in another movement, to release the skin, and a stationary knife against which the meat is carried and the skin severed from the fat.

12. In a fat-skinning machine, the combination with means for engaging and advancing the piece of meat, of a stationary knife and a means for discharging a heated fluid thereon whereby the knife is maintained both moist and warm.

13. In a fat-skinning machine, the combination with means for engaging and advancing the piece of meat, of a stationary knife, and a perforated steam-pipe in rear thereof and adapted to discharge jets of steam on the outside of the knife whereby said knife is kept both moist and warm.

14. In a fat-skinning machine, the combination of a revoluble drum means for engaging the piece of meat thereon, a stationary knife or cutter, a pressure-roller opposing the drum, and means including sleeves on the ends of the pressure-roller boxes or bearings having guided stems and springs engaging the stems, for supporting the roller and permitting it to yield in lines radial to the axis of the drum.

In testimony whereof I have hereunto set my hand in presence of two subscribing witnesses.

THOMAS W. TALIAFERRO.

Witnesses:
CHARLES K. URQUHART,
HENRY HUNTON.